United States Patent
Lapi et al.

(10) Patent No.: US 9,587,292 B2
(45) Date of Patent: Mar. 7, 2017

(54) METHOD AND APPARATUS FOR ISOLATING THE RADIOISOTOPE MOLYBDENUM-99

(75) Inventors: Suzanne Lapi, St. Louis, MO (US); Thomas J. Ruth, Vancouver (CA); Dirk W. Becker, Berlin (DE); John M. D'Auria, Vancouver (CA)

(73) Assignee: Advanced Applied Physics Solutions, Inc., Vancouver, B.C. (CA)

(*) Notice: Subject to any disclaimer, the term of this patent is extended or adjusted under 35 U.S.C. 154(b) by 784 days.

(21) Appl. No.: 12/588,030

(22) Filed: Oct. 1, 2009

(65) Prior Publication Data
US 2011/0079108 A1 Apr. 7, 2011

(51) Int. Cl.
*C22B 34/34* (2006.01)
*B01J 19/08* (2006.01)
*G21G 1/00* (2006.01)
*C22B 7/00* (2006.01)

(52) U.S. Cl.
CPC ............. *C22B 34/34* (2013.01); *B01J 19/081* (2013.01); *G21G 1/001* (2013.01); *C22B 7/002* (2013.01); *G21G 2001/0036* (2013.01); *Y02P 10/212* (2015.11)

(58) Field of Classification Search
CPC ........ C22B 34/34; C22B 7/002; B01J 19/081; G21G 1/00; G21G 2001/0036; G21G 1/001
USPC .............. 204/157.2, 257.2, 157.21; 75/10.67
See application file for complete search history.

(56) References Cited

U.S. PATENT DOCUMENTS

| | | | | |
|---|---|---|---|---|
| 2,471,935 A | * | 5/1949 | Coggeshall et al. | 250/283 |
| 2,709,222 A | * | 5/1955 | Lawrence | 250/284 |
| 2,727,152 A | * | 12/1955 | Barnes et al. | 250/285 |
| 3,228,848 A | * | 1/1966 | Fellows | 204/157.44 |
| 3,228,849 A | * | 1/1966 | Fellows | 204/157.44 |

(Continued)

FOREIGN PATENT DOCUMENTS

| | | |
|---|---|---|
| CA | 2543041 A1 | 5/2005 |
| EP | 0209470 A1 * | 1/1987 |

(Continued)

OTHER PUBLICATIONS

Noda et al, "Isotope separation of silicon and molybdenum using a free electron laser," J. of Nuclear Materials vol. 307-311 (2002) pp. 715-718.*

(Continued)

*Primary Examiner* — Keith Hendricks
*Assistant Examiner* — Colleen M Raphael
(74) *Attorney, Agent, or Firm* — Harness, Dickey & Pierce, P.L.C.

(57) ABSTRACT

A method of isolating $^{99}$Mo produced using a (n,γ) reaction according to example embodiments may include vaporizing a source compound containing $^{98}$Mo and $^{99}$Mo. The vaporized source compound may be ionized to form ions containing $^{98}$Mo and $^{99}$Mo. The ions may be separated to isolate the ions containing $^{99}$Mo. The isolated ions containing $^{99}$Mo may be collected with a collector. Accordingly, the isolated $^{99}$Mo may have a relatively high specific radioactivity and, in turn, may be used to produce the diagnostic radioisotope, $^{99m}$Tc, through radioactive decay.

11 Claims, 4 Drawing Sheets

(56) References Cited

U.S. PATENT DOCUMENTS

| | | | | |
|---|---|---|---|---|
| 3,228,850 | A * | 1/1966 | Fellows | 204/157.44 |
| 3,382,359 | A * | 5/1968 | Lee | 250/395 |
| 3,432,709 | A | 3/1969 | Lee et al. | |
| 3,833,469 | A * | 9/1974 | Robson | 250/303 |
| 3,999,097 | A * | 12/1976 | Ko et al. | 315/382 |
| 4,024,217 | A | 5/1977 | Wexler et al. | |
| 4,035,270 | A | 7/1977 | Lyon et al. | |
| 4,105,746 | A | 8/1978 | Compton et al. | |
| 4,123,498 | A * | 10/1978 | Rosenbaum et al. | 976/DIG. 398 |
| 4,124,801 | A * | 11/1978 | Cook et al. | 250/288 |
| 4,239,970 | A * | 12/1980 | Eckhardt et al. | 976/DIG. 398 |
| 4,578,589 | A * | 3/1986 | Aitken | 250/492.2 |
| 4,794,298 | A * | 12/1988 | Proudfoot | 250/396 R |
| 4,849,075 | A * | 7/1989 | Stevenson et al. | 204/157.2 |
| 5,108,566 | A * | 4/1992 | Eerkens | 204/157.2 |
| 5,110,430 | A * | 5/1992 | Eerkens | 204/157.2 |
| 5,196,706 | A * | 3/1993 | Keller et al. | 250/396 R |
| 5,204,530 | A | 4/1993 | Chastagner | |
| 5,563,410 | A * | 10/1996 | Mullock | 250/288 |
| 5,764,715 | A * | 6/1998 | Maenchen et al. | 250/492.3 |
| 5,784,423 | A | 7/1998 | Lidsky et al. | |
| 5,802,439 | A | 9/1998 | Bennett et al. | |
| 5,862,193 | A | 1/1999 | Jia et al. | |
| 5,874,811 | A * | 2/1999 | Finlan et al. | 315/502 |
| 6,191,417 | B1 * | 2/2001 | Douglas | H01J 49/004 250/281 |
| 6,787,723 | B2 * | 9/2004 | Pronko et al. | 204/157.2 |
| 6,800,827 | B2 * | 10/2004 | Yokoyama et al. | 204/157.2 |
| 7,708,961 | B2 * | 5/2010 | Lapi et al. | 423/49 |
| 2002/0043621 | A1 * | 4/2002 | Aitken | 250/281 |
| 2002/0114763 | A1 | 8/2002 | Glajch et al. | |
| 2003/0111948 | A1 | 6/2003 | Retsky | |
| 2003/0228255 | A1 | 12/2003 | Park et al. | |
| 2005/0008568 | A1 | 1/2005 | Mevellec et al. | |
| 2005/0082469 | A1 * | 4/2005 | Carlo | 250/262 |
| 2005/0258380 | A1 * | 11/2005 | White et al. | 250/492.21 |
| 2006/0023829 | A1 * | 2/2006 | Schenter et al. | 376/190 |
| 2006/0102464 | A1 * | 5/2006 | Tillotson | 204/157.2 |
| 2006/0219944 | A1 * | 10/2006 | Benveniste | 250/492.1 |
| 2008/0241025 | A1 * | 10/2008 | Lapi et al. | 423/49 |
| 2009/0162278 | A1 * | 6/2009 | Ravn et al. | 424/1.37 |
| 2010/0215137 | A1 * | 8/2010 | Nagai et al. | 376/158 |

FOREIGN PATENT DOCUMENTS

| | | | |
|---|---|---|---|
| GB | 1 385 325 | | 2/1975 |
| GB | 1473683 A * | | 5/1977 |
| JP | 04-071623 | | 3/1992 |
| RU | 2 158 167 | | 10/2000 |
| WO | WO 2005/077962 | | 8/2005 |
| WO | WO 2006/028620 | | 3/2006 |
| WO | WO 2006/074960 | | 7/2006 |
| WO | WO 2006074960 A1 * | 7/2006 | G21G 1/10 |
| WO | WO 2011002323 A2 * | 1/2011 | |
| WO | WO 2011040898 A1 * | 4/2011 | |

OTHER PUBLICATIONS

Kirchner, "On the release and ionization efficiency of catcher-ion-source systems in isotope separation on-line," Nuclear Instruments and Methods in Physics Research B70 (1992), pp. 186-189.*

Heumann et al, "Precision and accuracy in isotope ratio measurements by plasma source mass spectrometry," J. of Analytical Atomic Spectrometry, Sep. 1998, vol. 13, pp. 1001-1008.*

Farley, M., Rose, P. and Ryding, G. (2005) Freeman and Bernas Ion Sources, in The Physics and Technology of Ion Sources, Second Edition (ed. I. G. Brown), Wiley-VCH Verlag GmbH & Co. KGaA, Weinheim, FRG. doi: 10.1002/3527603956.ch8; Ch. 8, "Freeman and Bernas Ion Sources," published online Jul. 4, 2005.*

Rovey et al, "Simple Penning ion source for laboratory research and development applications," Rev. of Sci. Instrum., vol. 78, 106101 (2007): doi: 10.1063/1.2791983.*

K.G. Heumann, et al., "Recent Developments in Thermal Ionization Mass Spectrometric Techniques for Isotope Analysis," *Analyst*, vol. 120, pp. 1291-1299, 1995.

Written Opinion, dated Sep. 30, 2008.

International Search Report, dated Sep. 30, 2008.

V. Bechtold et al., "Industrial Application of the Karlsruhe Compact Cyclotron", Proc. 11$^{th}$ Int. Conf. on Cyclotrons and their Applications, 1987, pp. 593-596.

Brown, "Negative Ion Sources", The Physics and Technology of Ion Source, Second Edition, 2004, pp. 285-311.

M.P. Dehnel et al., "An ion source upgrade for an axial injection based commercial cyclotron," Nuclear Instruments and Methods in Physics Research B 241, 2005, pp. 896-900.

Notification of Transmittal of the International Search Report and the Written Opinion of the International Searching Authority, or the Declaration issued in related International application No. PCT/US 09/05410 dated Dec. 8, 2009.

Written Opinion of the International Searching Authority issued in related International application No. PCT/US 09/05410.

Suzanne Lapi, "Production and Evaluation of High Specific Activity $^{186}$RE: An Isotope for Radioimmunotherapy in Cancer Treatment", Simon Fraser University, pp. 1-158, (2007).

Suzanne Lapi, et al., "Production cross-sections of $^{181-186}$Re isotopes from proton bombardment of natural tungsten", Applied Radiation and Isotopes, 65, pp. 345-349, (2007).

Suzy Lapi, et al., "Production of high specific activity $^{186}$Re", Abstracts of Papers, 228$^{th}$ ACS National Meeting, Philadelphia, PA, United States, Aug. 22-26, 2004, NUCL-026, American Chemical Society.

Strem Chemicals, Inc., MSDS for potassium perrhenate.

Dennis R. Phillips. et al., "*Magnetic Mass Separator for Production of HSA Radionuclides*", Los Alamos National Laboratory Chemical Sciences and Technology, Symposium on Analytical Tools for the Production and Quality Control of Radiopharmaceuticals, Mar. 29, 2000.

Office Action for corresponding Canadian Application No. 2776043 dated Jul. 12, 2016.

* cited by examiner

METHOD AND APPARATUS FOR ISOLATING THE RADIOISOTOPE MOLYBDENUM-99

BACKGROUND

Technical Field

The present application relates to the production and extraction of radioisotopes from a source compound.

Description of the Related Art

Diagnostic radiopharmaceuticals may include radiolabeled molecules used to provide information about various parts and/or functions of a patient's body (e.g., tumour cells, neuroreceptors, cardiac blood flow). A number of different radioisotopes have been used for these purposes, such as single photon emitters (e.g., $^{99m}Tc$, $^{201}Tl$) and positron emitters (e.g., $^{11}C$, $^{18}F$).

$^{99m}Tc$ is a well-known radioisotope used for various diagnostic procedures. Because the half-life of $^{99m}Tc$ is only 6.02 h, this radioisotope is typically delivered to the medical practitioner in the form of the parent radioisotope, $^{99}Mo$, which has a longer half-life of about 65.9 h. The $^{99m}Tc$ is then obtained from the decay of the parent $^{99}Mo$.

$^{99}Mo$ may be produced via an $^{98}Mo(n,\gamma)^{99}Mo$ reaction using neutrons from a nuclear reactor or from a neutron generator. Alternatively, $^{99}Mo$ may be produced via a $^{235}U$ (n,fission) reaction. However, both reactions have their disadvantages. For a $^{98}Mo(n,\gamma)^{99}Mo$ reaction, the yield of the $^{99}Mo$ is diluted by the presence of the isotopic contaminant, $^{98}Mo$. As a result, the product has a relatively low specific activity (activity/mass) and final total activity. Such a $^{99}Mo$ product is not particularly useful in the commercial context. For a $^{235}U(n,fission)$ reaction, a relatively large amount of waste products are generated along with the $^{99}Mo$. Furthermore, the use of highly enriched uranium, which is the conventionally preferred target material, raises national security issues. On the other hand, the use of low enriched uranium has the problem that much more of the uranium is needed for the target, and more waste product is produced.

SUMMARY

A method of isolating a radioisotope for production of a higher specific activity radiopharmaceutical according to an example embodiment of the present invention may include vaporizing a source compound containing a plurality of isotopes of an element, wherein the plurality of isotopes include a primary isotope of the element and a desired isotope of the element. The desired isotope may be a parent radioisotope which decays to a daughter radioisotope having diagnostic or therapeutic properties. The vaporized source compound may be ionized to form ions containing the plurality of isotopes. The ions may be separated by mass so as to isolate the ions containing the desired isotope. An electromagnetic approach may be used to achieve the separation. The isolated ions containing the desired isotope may be electrically focused onto a collector.

A method of isolating $^{99}Mo$ according to an example embodiment of the present invention may include vaporizing a source compound containing isotopes of molybdenum (Mo). The isotopes of Mo may include a primary Mo isotope (e.g., $^{98}Mo$) and $^{99}Mo$, wherein the $^{99}Mo$ is a nuclear reaction product of the primary Mo isotope. The vaporized source compound may be ionized to form ions containing the isotopes of Mo. An electric field may be generated to extract and accelerate the ions away from the ion source. The electric field may be generated with extraction electrodes (e.g., acceleration electrodes). Additionally, a magnetic field may be generated to draw excess free electrons away from the ions. The ions may be separated by mass using an electro-magnetic separator to isolate the ions containing $^{99}Mo$. The isolated ions containing $^{99}Mo$ may be collected with a collector.

BRIEF DESCRIPTION OF THE DRAWINGS

The features and advantages of the example embodiments herein may become more apparent upon review of the detailed description below in conjunction with the attached drawings.

DETAILED DESCRIPTION

Figure 1:
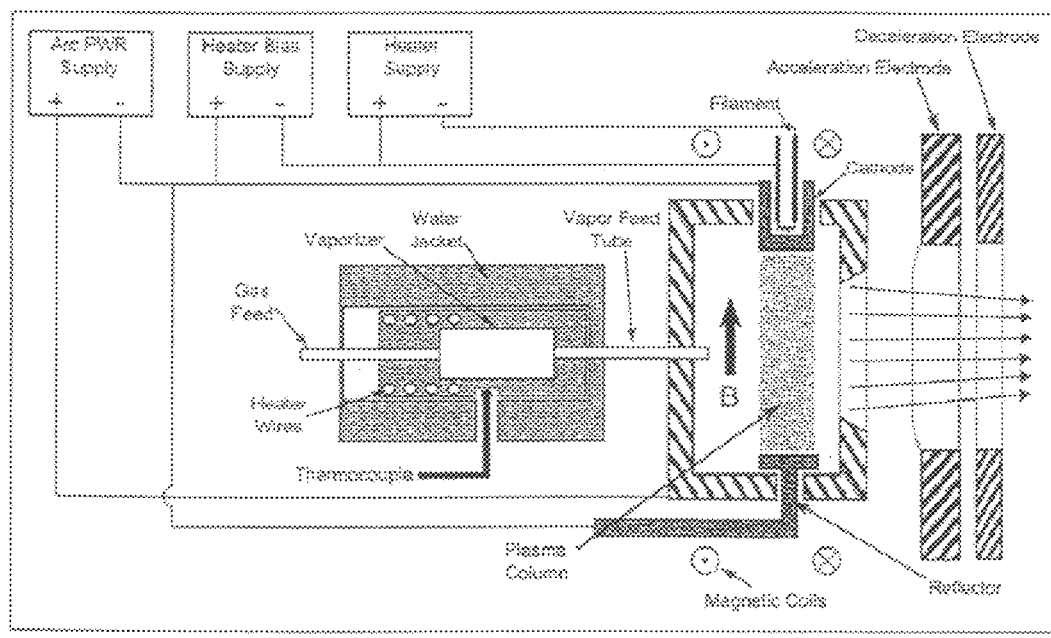
FIG. 1 is an electrical schematic diagram of an ion source according to an example embodiment of the present invention.

It will be understood that when an element or layer is referred to as being "on", "connected to", "coupled to", or "covering" another element or layer, it may be directly on, connected to, coupled to, or covering the other element or layer or intervening elements or layers may be present. In contrast, when an element is referred to as being "directly on," "directly connected to" or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, e.g., "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to certain cross-sectional illustrations that may be schematic illustrations of idealized embodiments and/or intermediate structures. As such, variations from the shapes of the illustrations are to be expected due to, for instance, manufacturing techniques and/or tolerances. Thus, example embodiments should not be construed as limited to the shapes illustrated herein but are to include deviations that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Example embodiments relate to the production and isolation of an ionic species from a source material. For instance, the methods according to example embodiments may be suitable for producing and isolating $^{99}$Mo (molybdenum-99) radioisotopes. The higher specific activity of the isolated $^{99}$Mo material allows for larger quantities of $^{99}$Mo to be applied to the generator material so as to achieve economies of scale in marketing $^{99}$Mo/$^{99m}$Tc generators. The higher specific activity of the isolated $^{99}$Mo material also leads to a higher production of the desired radioactive decay product from $^{99}$Mo (e.g., $^{99m}$Tc).

$^{99m}$Tc compounds may be utilized in a variety of medical applications. For example, a $^{99m}$Tc compound may be used in diagnosing various disorders depending upon the molecule to which the $^{99m}$Tc is attached. A number of such compounds are available and FDA-approved for both cardiology and oncology applications. Although the present application primarily discusses $^{99}$Mo, it should be understood that the methods and apparatuses according to example embodiments may also be applied to other radioisotopes so as to facilitate the production of additional higher specific radioactivity materials which may be utilized in a further range of research and/or diagnostic applications.

Conventional methods of producing $^{99}$Mo may utilize $^{98}$Mo (molybdenum-98), $^{100}$Mo (molybdenum-100), $^{235}$U (uranium-235), or $^{238}$U (uranium-238) as the starting material. The conventional method utilizing $^{98}$Mo as the starting material may be represented by expression (1) below:

$$^{98}Mo(n,\gamma)^{99}Mo \qquad (1)$$

wherein the $^{98}$Mo is converted to $^{99}$Mo through neutron capture. The method may be carried out with a reactor or other neutron source. Although this method may have moderately high yield, separating the desired $^{99}$Mo isotope from the starting material, $^{98}$Mo, is relatively difficult and is not feasible using chemical separation, thus resulting in products exhibiting relatively low specific radioactivity (activity/mass of molybdenum).

The conventional method utilizing $^{100}$Mo as the starting material may be represented by expression (2) below:

$$^{100}Mo(\gamma,n)^{99}Mo \qquad (2)$$

wherein the $^{100}$Mo is converted to $^{99}$Mo through photon capture. The photons may be produced using an electron accelerator. Unlike the method represented by expression (1) above, the method represented by expression (2) does not rely on a source of neutrons. However, the method represented by expression (2) may have a relatively low yield. Additionally, separating the desired $^{99}$Mo from the starting material, $^{100}$Mo, is relatively difficult and is not feasible using chemical separation, thus resulting in products exhibiting relatively low specific activity (activity/mass of molybdenum).

The conventional method utilizing $^{235}$U as the starting material may be represented by expression (3) below:

$$^{235}U(n,\text{fission})^{99}Mo \qquad (3)$$

wherein the $^{235}$U is converted to $^{99}$Mo through a neutron-induced, fission reaction within a reactor. This method has a relatively high specific radioactivity yield. The desired $^{99}$Mo isotope may be separated from the source material by chemical separation, thus resulting in products exhibiting improved levels of specific radioactivity. However, the chemical separation is relatively complex. Additionally, there is a relatively large amount of unwanted, long-lived waste production from the fission process. Furthermore, the use of highly enriched uranium as the target material raises national security issues.

The conventional method utilizing $^{238}$U as the starting material may be represented by expression (4) below:

$$^{238}U(\gamma,\text{fission})^{99}Mo \qquad (4)$$

wherein the $^{238}$U is converted to $^{99}$Mo through photo-fission of $^{238}$U in a similar fashion as for neutron fission of $^{235}$U. In fact, the yield distribution for these two methods of producing $^{99}$Mo is approximately 6% of every fission. However, the photon induced process has a much lower production rate than the neutron case. Thus, a relatively intense photon source is required for increased production. The gammas (photons) are produced using an electron accelerator with the electron beam of >25 MeV intercepting an appropriate converter material. The specific activity of the $^{99}$Mo from this process is relatively high, but the chemical separation is relatively complex. Also, like the neutron-induced fission process, there is a relatively large amount of unwanted, long-lived waste produced along with the $^{99}$Mo.

The methods and apparatuses according to example embodiments may involve vaporizing a source compound containing a plurality of isotopes of an element, wherein the plurality of isotopes includes a primary isotope of the element and a desired isotope of the same element. The desired isotope may be a nuclear reaction product of the primary isotope and may constitute a relatively minute portion of the plurality of isotopes. The desired isotope may also be a parent radioisotope which decays to a daughter radioisotope having diagnostic or therapeutic properties. The vaporized source compound may be ionized to form ions containing the plurality of isotopes. The ions may be separated so as to isolate ions containing the desired isotope. The isolated ions containing the desired isotope may be collected with a collector.

When producing the source compound, a target may be enriched with the primary isotope (e.g., $^{98}$Mo, $^{100}$Mo) so as to increase the amount of the desired isotope (e.g., $^{99}$Mo) resulting from the reaction. As discussed above, the reaction may be a neutron capture or photon capture reaction. Producing the source compound may be performed with a batch mode approach. Additionally, in view of the disadvantages discussed supra, it may be beneficial to produce the source compound with a process that does not involve irradiating a target containing uranium, particularly one that would involve the fission of uranium.

Using the above $^{98}$Mo(n,γ) $^{99}$Mo reaction, the resulting target material will consist essentially of $^{98}$Mo and $^{99}$Mo (the desired product). To mass separate these two isotopes, the $^{98}$Mo and $^{99}$Mo material is ionized in a specially-designed ion source. Once the isotopes $^{98}$Mo and $^{99}$Mo are ionized, the $^{99}$Mo can then be mass separated from the molybdenum (e.g., $^{98}$Mo) starting material so as to facilitate the production of increased specific radioactivity $^{99}$Mo compounds. Such compounds ultimately provide the diagnostic radioisotope, $^{99m}$Tc, by virtue of decay. According to example embodiments, radioisotope production of $^{99}$Mo in the range of about 100 6-day curies of material may be achieved, wherein the material exhibits relatively high specific radioactivity values (e.g., above 1000 curies/g).

To facilitate the production of higher specific radioactivity $^{99}$Mo compounds, an ion source may be employed to ionize and extract the $^{99}$Mo radioisotopes from the starting material. A number of suitable ion sources may be used, including a Bernas ion source, a Freeman ion source, a Chordis ion source, a Thermal ion source, an ECR ion source, a PIG ion source, a MEVVA ion source, or a laser-driven type ion source. Additional information regarding ion source technology may be found, for example, in "*The Physics and Technology of Ion Sources, Second, Revised and Extended Edition,*" edited by Ian G. Brown, WILEY-VCH (2004), the entire contents of which are incorporated herein by reference.

FIG. 1 is an electrical schematic diagram of an ion source according to an example embodiment of the present invention. Within the ion source, plasma may interact with the radioisotope source compound to produce one or more ionic species (e.g., $MoO_3^+$). The ionic species may be extracted, accelerated, mass analyzed, and directed toward a beam stop for collection. The beam stop may be water-cooled. As will be appreciated by those ordinarily skilled in the art, this technique may also be applied to other radioisotope source compounds (e.g., oxides, nitrides, halides) that can be vaporized under the appropriate temperature and pressure combination maintained within the ion source chamber. Additionally, those ordinarily skilled in the art will also appreciate that the proper temperature and pressure may be a function of the materials utilized, the power applied, and the configuration of the source chamber and the ancillary equipment (e.g., gas mass flow controllers, valving, control systems, vacuum pumps, cooling assemblies).

The ion source may be constructed and operated so as to enable the creation and maintenance of the appropriate temperature and pressure conditions within the ion source chamber. As a result, the radioisotope source material may be vaporized at a suitable rate without damaging the ion source chamber or generating undesirable levels of byproducts that would interfere with the collection and enrichment of the targeted radioisotope. The ion source may exhibit an efficiency greater than about 70%. Furthermore, the ion source may have single or multiple extraction slits. When the ion source has multiple extraction slits, a plurality of beamlets may be extracted from the multiple slits and converged to form a single beam.

Figure 2:
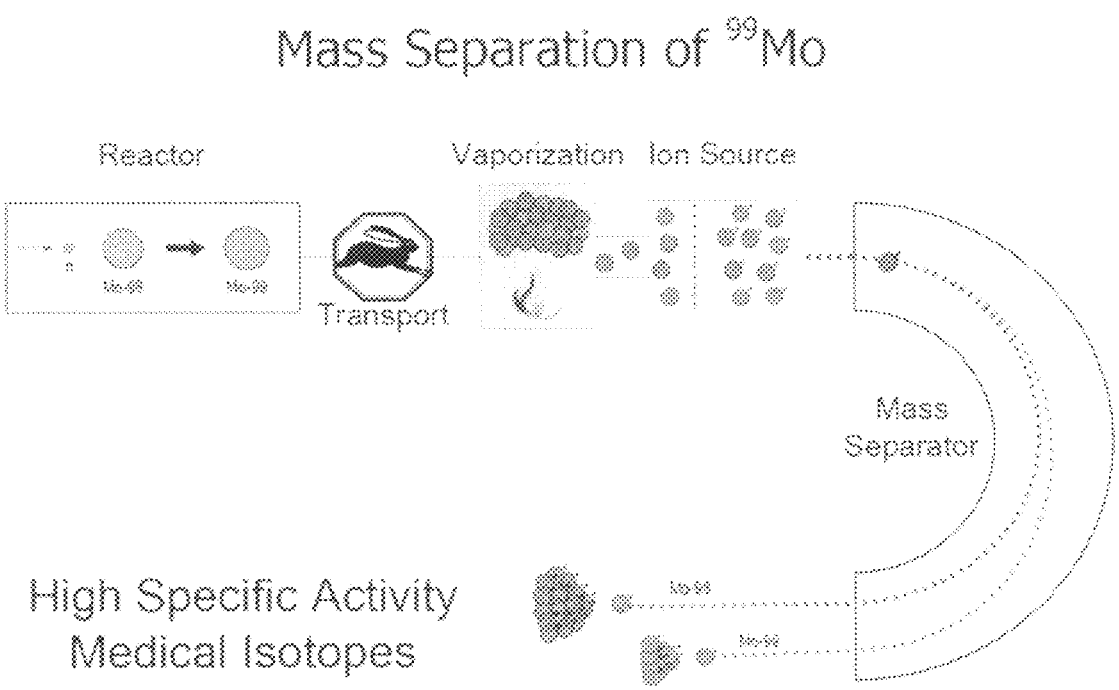
FIG. 2 is an illustration of a method of producing and isolating $^{99}Mo$ according to an example embodiment of the present invention.

FIG. 2 is an illustration of a method of producing and isolating $^{99}$Mo according to an example embodiment of the present invention. As discussed above, $^{99}$Mo can be produced from $^{98}$Mo with a $^{98}$Mo(n,γ) $^{99}$Mo reaction. The resulting $^{98}$Mo and $^{99}$Mo material can then be vaporized, ionized, and mass separated in accordance with the teachings herein to isolate the $^{99}$Mo.

Figure 3:
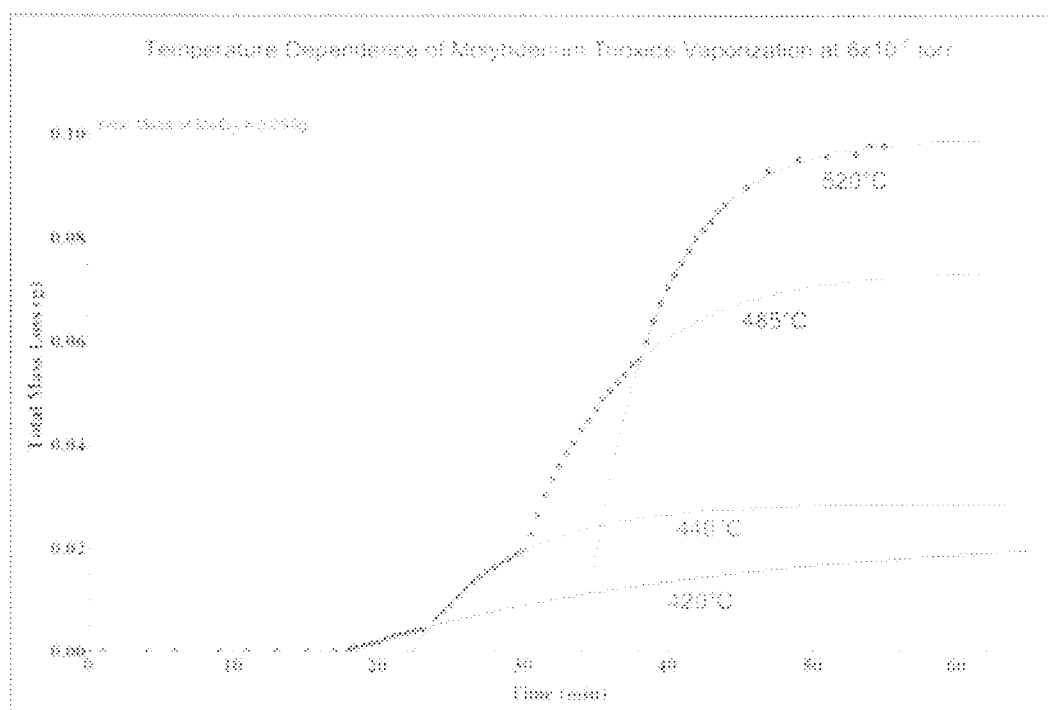
FIG. 3 is a graph showing the mass loss of $MoO_3$ due to vaporization as a function of temperature during production of a vapor for entry into an ion source according to an example embodiment of the present invention.

FIG. 3 is a graph showing the mass loss of $MoO_3$ due to vaporization as a function of temperature during production of a vapor for entry into an ion source according to an example embodiment of the present invention. For example, the radioisotope source compound utilized in the ion source may exhibit satisfactory vaporization at temperatures below about 600° C. Additionally, it may be beneficial for the radioisotope source compound to exhibit satisfactory vaporization at temperatures below about 500° C. so as to allow for the utilization of a wider range of materials in the construction of the ion source chamber. Furthermore, it may be beneficial for the radioisotope source compound utilized in the ion source to exhibit satisfactory vaporization at pressures below about 1 Torr.

The use of an appropriately sized resistor may allow the production of plasma capable of heating the source compound and its vessel to temperatures in excess of about 500° C., thereby volatilizing the source compound (e.g., molybdenum trioxide). Consequently, the source compound may dissociate within the plasma, with the resulting fragments becoming ions (e.g., $MoO_n^+$). The ions may be extracted from the ion source chamber as a beam and implanted on a beam stop. The beam may have an intensity of at least 10 mA (e.g., 30 mA, 100 mA). Additionally, a plurality of beamlets may be extracted from the ion source and converged to form a single beam. Furthermore, the beam may be manipulated with a lens system that is configured to minimize space charge effects.

Isolating the desired isotope may be a challenge, because the quantity of the desired isotope in the source compound may be relatively sparse. For instance, the relative quantity of $^{99}$Mo to $^{98}$Mo may be in the order of about $1:10^4$ to $1:10^6$. Additionally, the separation of $^{99}$Mo from $^{98}$Mo is complicated by the fact that the mass of $^{99}$Mo and $^{98}$Mo differ by only one neutron. Thus, the mass analyzer will need to exhibit a suitable mass resolution factor to achieve an acceptable separation. For instance, where the relative quantity of $^{99}$Mo to $^{98}$Mo is in the order of about 1:100,000, a mass resolution factor of more than about 1000 may be needed to achieve a suitable separation for the $^{99}$Mo. To further complicate matters, $^{99}$Mo is unstable and has a half-life of about 65.9 h. Accordingly, to attain a product with a relatively high specific activity, adequate quantities of $^{99}$Mo will need to be isolated in a relatively efficient manner to account for the loss that will inevitably result from decay that begins from the time of production and continues through the subsequent separation, processing, transporting, and other steps that may be needed to commercially realize the product.

Figure 4:
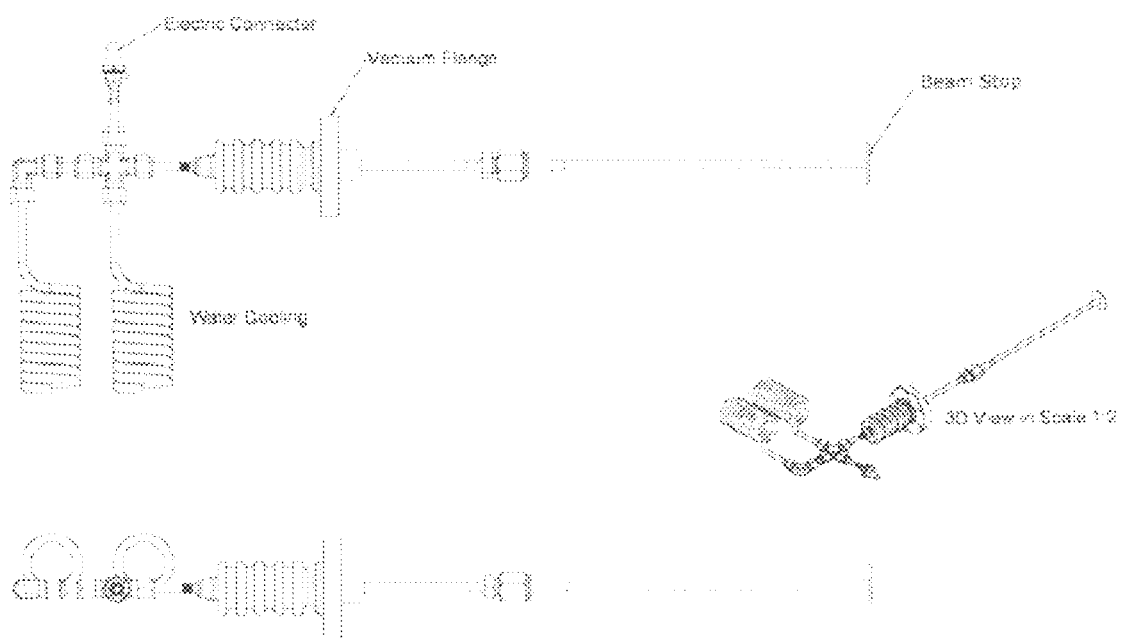
FIG. 4 is a plan view, side view, and perspective view of a water-cooled beam stop according to an example embodiment of the present invention.

FIG. 4 is a plan view, side view, and perspective view of a water-cooled beam stop for an ion source according to an example embodiment of the present invention. After an implant cycle, the beam stop may be removed and evaluated using gamma spectroscopy to determine the amount of radioactivity implanted in the beam stop. Alternatively, remote processing systems may be used to recover the separated $^{99}$Mo. Ion source performance analysis indicates that the apparatus illustrated in FIG. 1 may adhere to beam currents of about 50 mA. For instance, $^{98}$MoO$_n^+$ may constitute a major portion of the beam, while $^{99}$MoO$_n^+$ may constitute a minor portion of the beam. The collected ions containing $^{99}$Mo may be chemically treated to remove unwanted, isobaric species (e.g., $^{99}$Tc). The treated $^{99}$Mo may then be converted into a suitable chemical form for medical applications. The primary isotope (e.g., $^{98}$Mo, $^{100}$Mo) recovered from the implant cycle may be reused in a subsequent cycle to produce $^{99}$Mo.

Additional efforts may be directed toward improving the extraction percentage, wherein the extraction percentage may be the portion of the desired isotopes released from the source compound vessel (e.g., graphite evaporator cell). For example, by providing a combination of both stable and radioactive molybdenum atoms on the source compound vessel in the ion source chamber, the majority of the radioactive atoms may be successfully vaporized, ionized, and collected at the target assembly (e.g., beam stop). As will be appreciated by those ordinarily skilled in the art, various combinations of stable and radioactive atoms, extraction voltages, pressure conditions, slit openings, and lens configurations may provide for further improvements in the extraction percentage.

As will also be appreciated by those ordinarily skilled in the art, alternative configurations may provide for different heating arrangements. For example, resistance heating and/or microwave heating may be used in lieu of or in addition to the plasma for vaporizing the source compound. Similarly, alternative structures (e.g., higher voltage filaments) may be utilized to impart a charge (e.g., negative charge) to the vaporized source compound fragments so that the desired species (e.g., positive ion radioactive species) may be extracted from the ion source chamber and accelerated toward a collection assembly. Furthermore, the source compound may be introduced into the ion source chamber as a vapor. Thus, when properly configured according to the present disclosure, various alternative example embodiments may be attained for purposes of producing higher specific radioactivity compounds. Depending on the separation assembly (e.g., magnetic separation assembly), specific radioactivity values in the range of about 30 curies/g to over 1000 curies/g (e.g., 5000 curies/g) may be achieved using the methods and apparatuses according to example embodiments.

A BERNAS (indirectly heated cathode) or CHORDIS ion source, modified appropriately to achieve the required high intensity extracted ion beams, may be used to separate $^{99}$Mo from the neutron-irradiated $^{98}$Mo by ionizing MoO$_3$ molecules and implanting them on an appropriate collector element or beam stop.

During the operation of the ion source, a plasma including an equilibrium of volatile ionized and neutral molybdenum trioxide molecules may be generated in the ionizer volume. An excess of free electrons, formed during the ionization process, may also be present. To reduce or prevent further acceleration of the excess free electrons, a relatively weak electric or magnetic field may be established at the "exit" of the ionizer to draw the excess free electrons away from the ions. The electric or magnetic field may be generated with a screening electrode (e.g., deceleration electrode).

Although the example embodiments detailed above are directed to the production of higher specific activity $^{99}$Mo compounds, the present disclosure is not limited thereto. For instance, the methods and apparatuses described above may be applied to the extraction of other radioisotope species (e.g., $^{186}$Re) that can be vaporized and charged within an ion source chamber constructed and operated in accordance with the above description. Additional information may be found in related U.S. application Ser. No. 12/078,409, filed Mar. 31, 2008, the entire contents of which are incorporated herein by reference. Other radionuclides that would benefit from being separated from stable or radioactive isotopes of the same element may include, for instance, $^{211}$At (from $^{210}$At) and $^{124}$I (from $^{123}$I, $^{125}$I).

The methods and apparatuses according to example embodiments may be used to isolate a variety of isotopes, thereby facilitating the production of a variety of higher specific activity compounds (e.g., radiopharmaceuticals). Those ordinarily skilled in the art will readily appreciate, however, that certain aspects (e.g., type of ion source) may vary depending upon the particular molecule or compound involved. As discussed herein, the methods and apparatuses according to example embodiments may be utilized to produce an increased volume of a range of higher specific activity radioisotope materials having a longer shelf life and improved diagnostic effects compared to conventional production and purification techniques.

While example embodiments have been disclosed herein, it should be understood that other variations may be possible. Such variations are not to be regarded as a departure from the spirit and scope of example embodiments of the present disclosure, and all such modifications as would be obvious to one skilled in the art are intended to be included within the scope of the following claims.

The invention claimed is:
1. A method of isolating $^{99}$Mo, comprising:
providing an ion source including a plurality of extraction apertures;
producing a source compound with a batch mode approach, the source compound containing isotopes of Mo including $^{98}$Mo, $^{99}$Mo, and $^{100}$Mo,
vaporizing the source compound via heating;
ionizing the vaporized source compound to form ions containing the isotopes of Mo;
extracting a plurality of beamlets of ions from the vaporized source compound through the plurality of extraction apertures;
converging the plurality of beamlets to form a single beam;
mass separating ions including $^{98}$Mo and $^{99}$Mo from the single beam with an electromagnetic mass separator configured to isolate ions containing $^{98}$Mo and $^{99}$Mo; and
collecting the separated ions containing $^{98}$Mo from the single beam with a first beam stop;
collecting the separated ions containing $^{99}$Mo from the single beam with a second beam stop;
storing the mass separated ions including $^{98}$Mo for subsequent use; and
storing the mass separated ions including $^{99}$Mo for subsequent use in the production of $^{99m}$Tc; and introducing the single beam of the ions into the mass separator with a lens system configured to minimize space charge effects.

2. The method of claim 1, wherein treating the collected ions includes removing $^{99}$Tc.

3. The method of claim 1, further comprising:
mass separating ions including $^{100}$Mo from the single beam with an electromagnetic mass separator configured to isolate ions including $^{100}$Mo;
collecting the separated ions including $^{100}$Mo from the single beam with a third beam stop; and
utilizing the $^{100}$Mo in a subsequent cycle for producing $^{99}$Mo.

4. A method of isolating $^{99}$Mo, comprising:
providing an ion source including a plurality of extraction apertures;
producing a source compound with a batch mode approach, the source compound containing isotopes of Mo including $^{98}$Mo, $^{99}$Mo, and $^{100}$Mo,
vaporizing the source compound via heating;
ionizing the vaporized source compound to form ions containing the isotopes of Mo;
extracting a plurality of beamlets of ions from the vaporized source compound through the plurality of extraction apertures;
converging the plurality of beamlets to form a single beam;
mass separating ions including $^{98}$Mo and $^{99}$Mo from the single beam with an electromagnetic mass separator configured to isolate ions containing $^{98}$Mo and $^{99}$Mo; and
collecting the separated ions containing $^{98}$Mo from the single beam with a first beam stop;
collecting the separated ions containing $^{99}$Mo from the single beam with a second beam stop;
storing the mass separated ions including $^{98}$Mo for subsequent use; and
storing the mass separated ions including $^{99}$Mo for subsequent use in the production of $^{99m}$Tc,
wherein the mass separating the ions includes configuring the mass separator to isolate the ions containing $^{99}$Mo, where a relative quantity of $^{99}$Mo to the isotopes of Mo is in the order of about 1 in 100,000.

5. The method of claim 4, wherein treating the collected ions includes removing $^{99}$Tc.

6. The method of claim 4, further comprising:
mass separating ions including $^{100}$Mo from the single beam with an electromagnetic mass separator configured to isolate ions including $^{100}$Mo;
collecting the separated ions including $^{100}$Mo from the single beam with a third beam stop; and
utilizing the $^{100}$Mo in a subsequent cycle for producing $^{99}$Mo.

7. A method of isolating $^{99}$Mo, comprising:
providing an ion source including a plurality of extraction apertures;
producing a source compound with a batch mode approach, the source compound containing isotopes of Mo including $^{98}$Mo, $^{99}$Mo, and $^{100}$Mo,
vaporizing the source compound via heating;
ionizing the vaporized source compound to form ions containing the isotopes of Mo;
extracting a plurality of beamlets of ions from the vaporized source compound through the plurality of extraction apertures;
converging the plurality of beamlets to form a single beam;

mass separating ions including $^{98}$Mo and $^{99}$Mo from the single beam with an electromagnetic mass separator configured to isolate ions containing $^{98}$Mo and $^{99}$Mo; and
collecting the separated ions containing $^{98}$Mo from the single beam with a first beam stop;
collecting the separated ions containing $^{99}$Mo from the single beam with a second beam stop;
storing the mass separated ions including $^{98}$Mo for subsequent use; and
storing the mass separated ions including $^{99}$Mo for subsequent use in the production of $^{99m}$Tc,
wherein the mass separating the ions is achieved with a mass separator exhibiting a mass resolution factor of more than 1000 so as to isolate ions containing $^{99}$Mo from ions containing $^{98}$Mo or $^{100}$Mo, and a relative quantity of $^{99}$Mo to the isotopes of Mo being in the order of about 1 in 100,000.

8. The method of claim 7, wherein treating the collected ions includes removing $^{99}$Tc.

9. The method of claim 7, further comprising:
mass separating ions including $^{100}$Mo from the single beam with an electromagnetic mass separator configured to isolate ions including $^{100}$Mo;
collecting the separated ions including $^{100}$Mo from the single beam with a third beam stop; and
utilizing the $^{100}$Mo in a subsequent cycle for producing $^{99}$Mo.

10. A method of isolating $^{99}$Mo, comprising:
providing an ion source including a plurality of extraction apertures;
producing a source compound with a batch mode approach, the source compound containing isotopes of Mo including $^{99}$Mo and $^{100}$Mo,
vaporizing the source compound via heating;
ionizing the vaporized source compound to form ions containing the isotopes of Mo;
extracting a plurality of beamlets of ions from the vaporized source compound through the plurality of extraction apertures;
converging the plurality of beamlets to form a single beam;
mass separating ions including $^{100}$Mo and $^{99}$Mo from the single beam with an electromagnetic mass separator configured to isolate ions containing $^{100}$Mo and $^{99}$Mo; and
collecting the separated ions containing $^{100}$Mo from the single beam with a first beam stop;
collecting the separated ions containing $^{99}$Mo from the single beam with a second beam stop;
storing the mass separated ions including $^{100}$Mo for subsequent use; and
storing the mass separated ions including $^{99}$Mo for subsequent use in the production of $^{99m}$Tc; and
introducing the single beam of the ions into the mass separator with a lens system configured to minimize space charge effects.

11. A method of isolating $^{99}$Mo, comprising:
providing an ion source including a plurality of extraction apertures;
producing a source compound with a batch mode approach, the source compound containing isotopes of Mo including $^{99}$Mo and $^{100}$Mo,
vaporizing the source compound via heating;
ionizing the vaporized source compound to form ions containing the isotopes of Mo;

extracting a plurality of beamlets of ions from the vaporized source compound through the plurality of extraction apertures;

converging the plurality of beamlets to form a single beam;

mass separating ions including $^{100}$Mo and $^{99}$Mo from the single beam with an electromagnetic mass separator configured to isolate ions containing $^{100}$Mo and $^{99}$Mo; and collecting the separated ions containing $^{100}$Mo from the single beam with a first beam stop;

collecting the separated ions containing $^{99}$Mo from the single beam with a second beam stop;

storing the mass separated ions including $^{100}$Mo for subsequent use; and storing the mass separated ions including $^{99}$Mo for subsequent use in the production of $^{99m}$Tc, wherein the mass separating the ions includes configuring the mass separator to isolate the ions containing $^{99}$Mo, where a relative quantity of $^{99}$Mo to the isotopes of Mo is in the order of about 1 in 100,000.

* * * * *